May 20, 1941.  V. R. McFEE  2,242,789
METHOD AND APPARATUS FOR INJECTING FERTILIZER INTO THE SOIL
Filed Sept. 22, 1938

INVENTOR.
Vernon R. McFee
BY Earl + Chappell
ATTORNEYS.

Patented May 20, 1941

2,242,789

UNITED STATES PATENT OFFICE 2,242,789

METHOD AND APPARATUS FOR INJECTING FERTILIZER INTO THE SOIL

Vernon R. McFee, Kalamazoo, Mich.

Application September 22, 1938, Serial No. 231,144

10 Claims. (Cl. 47—49)

This invention relates to a method for and an apparatus for injecting fertilizer into the soil and below the surface thereof in order to fertilize trees, shrubs and the like. In particular it relates to such apparatus and method in which water is employed for injecting pulverized or granular commercial fertilizers into the soil and below the surface thereof. It has for its objects:

First, to produce a new and improved apparatus for injecting fertilizer into the soil.

Second, to provide such an apparatus which may be used to inject all of the various commercial fertilizers into the soil near the roots of trees and the like in a most efficient and satisfactory manner.

Third, to provide such an apparatus which will completely and effectively inject the fertilizer into the soil below the surface thereof.

Fourth, to provide such an apparatus which is of simple construction and in which the fertilizer is taken in suspension into a stream of water which is then carried into the soil and below the surface thereof.

Fifth, to provide a new and improved method of injecting fertilizer into the soil below the surface thereof.

Sixth, to provide such a method which is effective in handling all sorts of commercial fertilizer and in which by a whirling or agitation of the water and fertilizer the fertilizer in suspension in the water is taken down into the ground by injection.

Other objects and advantages pertaining to details and economies of construction and operation will appear from the description to follow. The invention is defined in the claims. Preferred embodiments of my invention are illustrated in the accompanying drawing, in which:

Fig. 1 is a view in perspective of my improved apparatus for injecting fertilizer. In full lines the apparatus is shown partially injected into the soil. In dotted lines the position of complete insertion is shown.

The apparatus which I employ consists of a container 1 of substantially cylindrical form to receive the fertilizer to be injected into the soil. This container has a cover 2 which may be closed tightly on the container by means of a screw 3 provided with a hand wheel 4. By removing the cover 2 it is possible to re-charge the container after one charge of fertilizer has been injected into the soil.

Figure 5:
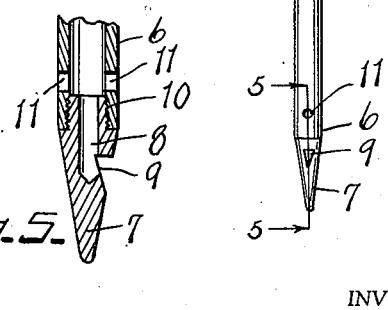
Fig. 5 is a detail sectional view taken on the line 5—5 of Fig. 2.

In order to inject the fertilizer into the soil, I provide a tube 5 having one end 6 thereof formed with a point to facilitate insertion. The preferred form of construction of the tube is shown in Fig. 5. A special point 7 centrally apertured at 8 and having a side opening 9 to permit fluid flow from the tube is provided. This tip 7 is screw threaded as at 10 into the end of the tube 5 which is also provided with apertures 11 for the passage of fluid.

Figure 2:
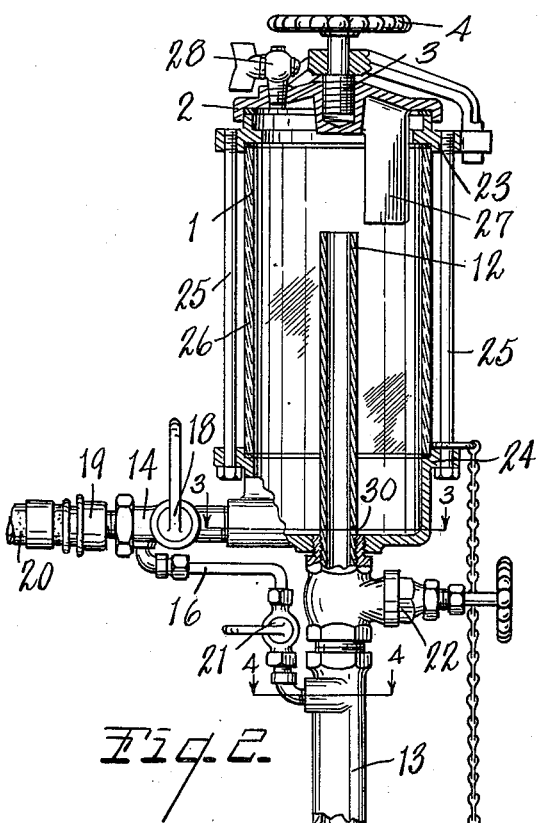
Fig. 2 is an elevational view partly in section through my improved apparatus.

The upper end 12 of tube 5 is open as shown. The tube extends axially through the bottom of the container 1 and up into the container nearly to the top thereof as is best seen in Fig. 2. In the tube in the preferred form of invention is a cylindrical chamber 13 disposed below the container 1. As shown this chamber may be formed as a casting.

There is provided an inlet passageway 14 which has a discharge 15 directed tangentially of the lower portion of the container 1.

Figure 4:
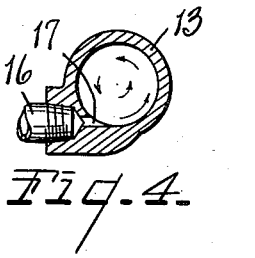
Fig. 4 is a detail sectional view taken on the line 4—4 of Fig. 2.

A by-pass 16 extending from the inlet passage 14 to the tube 5 is provided. In the preferred form of invention as shown in Fig. 4, the by-pass discharges into the chambered portion 13 of the tube 5 and the discharge 17 therefrom is disposed tangentially of the cylinder.

In the inlet passage 14 is a valve 18 to control the flow through the passage. This valve is disposed between the by-pass 16 and the discharge 15 of the inlet passage 14. The inlet passage is provided at its end with a suitable coupling 19 for attachment to a hose 20 such as a garden hose which may be attached to any suitable source of water supply.

A valve 21 in the by-pass 16 controls the flow of water therethrough.

A valve 22 disposed in the tube 5 between the upper open end 12 thereof or the bottom of the container 1 and the by-pass 16 is provided to control the flow of fluid through the tube 5.

The container 1 is specially constructed to permit the user of my apparatus to determine when all of the fertilizer or the like charged into the container 1 has been injected. It will be noted that the container 1 consists of upper head 23 and lower head 24 connected by tie-rods 25. The body of the container is a section of transparent tubing 26 which is clamped between the heads to form the closed container.

On the cover 2 I provide a baffle 27 which extends down into the container adjacent to the upper end 12 of the tube 5 for a purpose which will be later explained.

In the cover 2 of container 1, I provide a petcock 28 the purpose of which will be later explained. In order to facilitate inserting the tube 5 into the ground I provide handles 29 on the apparatus.

Figure 1:
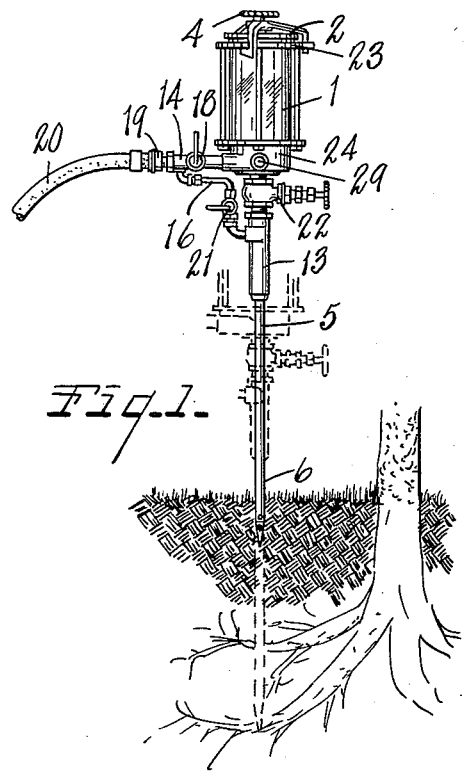

The method of using my apparatus is as follows: The fertilizer or the like, which may be the common pulverized or granular fertilizer, either soluble or insoluble, is charged into container 1 which is closed by clamping the cover 2 in place. The petcock 28 is closed. The valve 18 is closed to prevent the passage of water into the container 1 and the valve 22 is closed. Water is introduced through the hose 20 and the valve 21 in the by-pass is opened. The water flowing through the by-pass 16 is introduced into the tube 5 at the chambered portion 13 where it is given a rotary motion as indicated by the small arrows in Fig. 4. The operator grasps the handle 29 of the apparatus and forces the pointed end 6 of the tube 5 into the soil. The water flowing through the tube 5 assists materially in getting the tube into the ground and the fact that the water is flowing prevents any clogging of the openings 11 and 9 so that when the fertilizer is to be injected it will be able to flow through these openings into the soil. I prefer, after completing the insertion of my apparatus as indicated in dotted lines in Fig. 1, to let the water flow through the by-pass for a short time to thoroughly soften the ground and make it receptive for the water and fertilizer to follow, so that it can flow into the ground satisfactorily.

Figure 3:
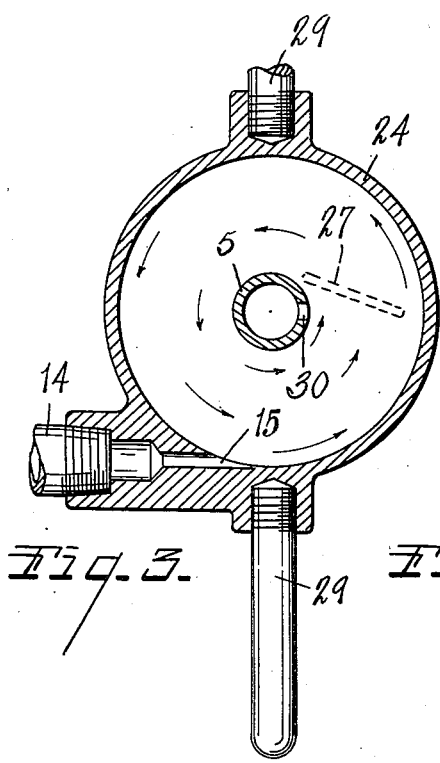
Fig. 3 is a detail sectional view taken on the line 3—3 of Fig. 2.

The next step is to open valves 18 and 22. When the valve 18 is opened, the water, entering the container 1 tangentially, sets up a spinning or whirling of the water in the container 1 as shown by the arrows in Fig. 3. This agitates the water and fertilizer together and a portion of the fertilizer is immediately taken into suspension in the water and is carried along in the current of water created by opening the valve 18 and the valve 22.

The container 1 being closed fills up with a whirling mass of water and fertilizer in suspension. When the water has risen to a level above the end 12 of the tube 5, it is possible for the water to flow down through the tube. The closed container assists in causing the flow through the tube and the baffle 27 tends to break up any vortex formed to direct the flow toward the tube so that the water with the fertilizer suspended in the current formed passes down through the tube 5 to the soil.

At this point one may, if desired, close the valve 21 shutting off the by-pass. This is not necessary, however, and the whirling motion of the added water at the chambered portion 13 will to some extent tend to keep the fertilizer in suspension in the current of water if it is necessary at this time.

The water is admitted through the hose 20 until all of the fertilizer has been taken into suspension in the current of water and injected into the ground through the tube 5. By having a transparent wall as at 26, it is possible for the operator to determine when the fertilizer has been completely taken up and injected.

After the fertilizer has all been taken up the valve 18 is closed and the petcock 28 is opened. The water then immediately drains down through the tube 5 and opening 30 in the tube 5 serves as a drain to permit complete drainage of the container 1. If it is desired to inject more fertilizer, this is brought about by a repetition of the steps above set forth.

Following out my method it is possible to inject fertilizers whether soluble or not into the soil below the surface thereof to fertilize the roots of trees, shrubs or the like. It is possible to handle all types of commercial fertilizers and the fertilizers are injected into the soil in extremely short operating periods. It will be apparent that modifications of my apparatus and method may be made without departing in any way from my invention which is shown and described in the foregoing specification by a description of a preferred form of the invention which is not intended to be limited.

Having thus described my invention, what I claim as new and desire to secure by Letters Patent is:

1. An apparatus of the class described for injecting pulverized fertilizer or the like into the soil comprising a substantially cylindrical closed container for the fertilizer to be injected, a tube having one end formed for insertion into the soil and apertured to permit fluid flow therefrom and having the other end open and extending substantially axially through the bottom of and into said container, a water inlet passage having its discharge directed tangentially of and into the lower portion of said container, a substantially cylindrical chamber in said tube below said container, a by-pass extending from said water inlet passage in advance of its discharge to said chamber and having its discharge directed tangentially of said chamber, a valve in said by-pass, a valve in said inlet passage between its discharge and the by-pass, and a valve in said tube between its open end which is in said container and said by-pass.

2. An apparatus of the class described for injecting pulverized fertilizer or the like into the soil comprising a substantially cylindrical closed container for the fertilizer to be injected, a tube having one end formed for insertion into the soil and apertured to permit fluid flow therefrom and having the other end open and extending substantially axially through the bottom of and into said container, a water inlet passage having its discharge directed tangentially of and into the lower portion of said container, a by-pass extending from said water inlet passage in advance of its discharge to said tube, a valve in said by-pass, a valve in said inlet passage between its discharge and the by-pass, and a valve in said tube between its open end which is in said container and said by-pass.

3. An apparatus of the class described for injecting pulverized fertilizer or the like into the soil comprising a substantially cylindrical closed container for the fertilizer to be injected, a tube having one end formed for insertion into the soil and apertured to permit fluid flow therefrom and having the other end open and extending substantially axially through the bottom of and into said container, a water inlet passage having its discharge directed tangentially of and into the lower portion of said container, a by-pass extending from said water inlet passage in advance of its discharge to said tube, a valve in said by-pass, a valve in said inlet passage between its discharge and the by-pass, a valve in said tube between its open end which is in said container and said by-pass, and a baffle in said container adjacent to the open end of said tube.

4. An apparatus of the class described for injecting pulverized fertilizer or the like into the soil comprising a substantially cylindrical closed container for the fertilizer to be injected, a tube having one end formed for insertion into the soil and apertured to permit fluid flow therefrom and having the other end open and extending substantially axially through the bottom of and into said container, a water inlet passage having its discharge directed tangentially of and into said container, a by-pass extending from said water inlet passage in advance of its discharge to said tube, a valve in said by-pass, a valve in said inlet passage between its discharge and the by-pass, and a valve in said tube between its open end which is in said container and said by-pass.

5. An apparatus of the class described for injecting pulverized fertilizer or the like into the soil comprising a substantially cylindrical closed container for the fertilizer to be injected, a tube having one end formed for insertion into the soil and apertured to permit fluid flow therefrom and having the other end open and extending substantially axially through the bottom of and into said container, a water inlet passage having its discharge directed tangentially of and into the lower portion of said container, a by-pass extending from said water inlet passage in advance of its discharge to said tube.

6. An apparatus of the class described for injecting pulverized fertilizer or the like into the soil comprising a substantially cylindrical closed container for the fertilizer to be injected, a tube having one end formed for insertion into the soil and apertured to permit fluid flow therefrom and having the other end open and extending substantially axially through the bottom of and into said container, a water inlet passage having its discharge directed tangentially of and into said container, a by-pass extending from said water inlet passage in advance of its discharge to said tube.

7. In an apparatus of the class described for injecting pulverized fertilizer or the like into the soil, a substantially cylindrical closed container for the fertilizer to be injected, a tube having one end formed for insertion into the soil and apertured to permit fluid flow therefrom and having the other end open and extending substantially axially through the bottom of and into said container, a water inlet passage having its discharge directed tangentially of and into the lower portion of said container, and independent means for creating a flow of water in said tube and not into said container.

8. In an apparatus of the class described for injecting pulverized fertilizer or the like into the soil, a substantially cylindrical closed container for the fertilizer to be injected, a tube having one end formed for insertion into the soil and apertured to permit fluid flow therefrom and having the other end open and extending substantially axially through the bottom of and into said container terminating above said bottom, a water inlet passage having its discharge directed tangentially of and into the lower portion of said container.

9. The method of injecting pulverized fertilizer or the like into the soil comprising creating a current of water and causing it to flow into the soil at a point below the surface of said soil, then creating a separate current of water, causing said separate current of water to whirl in the presence of the fertilizer to be injected to create a suspension of said fertilizer in the water of said separate current, and causing said separate current of water with the fertilizer suspended therein to flow into the soil at the same point as said first mentioned current of water.

10. The method of injecting pulverized fertilizer or the like into the soil comprising creating a current of water and causing it to flow into the soil at a point below the surface of said soil, then creating a separate current of water, causing said separate current of water to flow in a manner to pick up and suspend the fertilizer to be injected, and causing said separate current of water with the fertilizer suspended therein to flow into the coil at the same point as said first mentioned current of water.

VERNON R. McFEE.